A. A. MIXER.
Potato-Bug Destroyers.

No. 143,245. Patented September 30, 1873.

Attest
Y. Black
H. P. K. Peck

A. A. Mixer
Inventor.

UNITED STATES PATENT OFFICE.

ALFRED A. MIXER, OF HAMILTON, OHIO, ASSIGNOR OF ONE-HALF HIS RIGHT TO FRANK BLACK, OF SAME PLACE.

IMPROVEMENT IN POTATO-BUG DESTROYERS.

Specification forming part of Letters Patent No. 143,245, dated September 30, 1873; application filed August 16, 1873.

*To all whom it may concern:*

Be it known that I, ALFRED A. MIXER, of Hamilton, in the county of Butler and State of Ohio, have invented a new and useful Improvement in Machines for Destroying Potato-Bugs; and I do hereby declare that the following is a full, clear, and exact description thereof, reference being had to the accompanying drawings, and to the letters of reference marked thereon.

Figure 1:
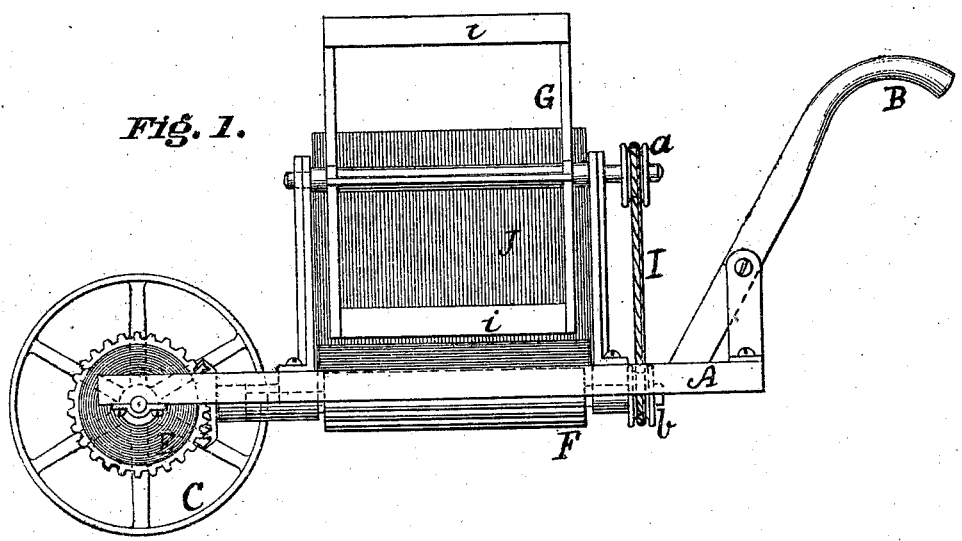
Figure 2:
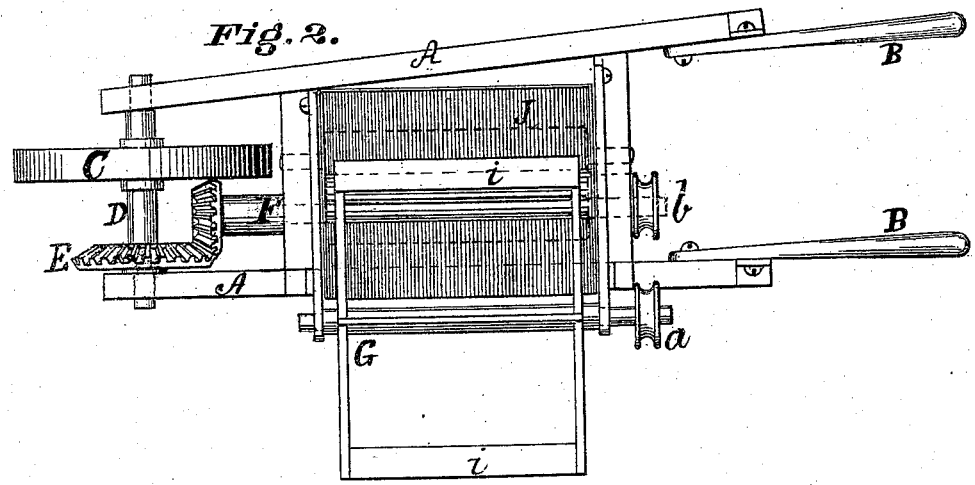
Figure 3:
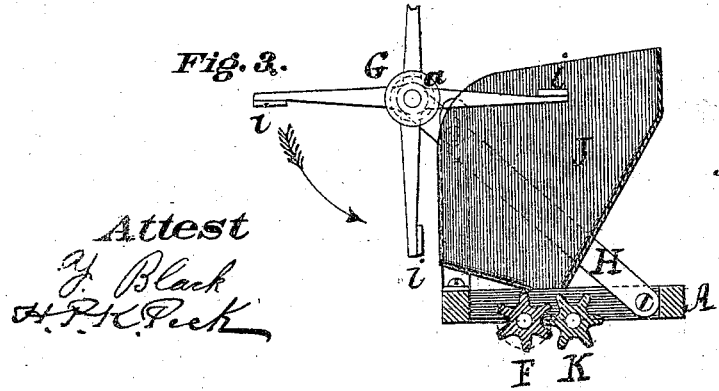

Figure 1 represents a side elevation of my improved machine. Fig. 2 represents a plan or top view of the same. Fig. 3 represents a transverse sectional view of the reel and corrugated rolls, with the hopper and frame.

The frame A of my machine is provided with handles B and a carrying-wheel, C, which also serves to drive its operative mechanism. Axle D is provided with a beveled gear-wheel, E, that meshes with a beveled gear upon the front end of the shaft or roller F, having its bearings in the frame, as represented in the drawings. The reel G is supported upon vertically-adjustable arms H, and its central shaft is provided with a pulley, $a$, and the belt I connects pulley $a$ with a similar pulley, $b$, on the rear end of shaft F. The angular hopper J is made with its side open, that the beaters or slats of the reel may pass within it. The roller F is corrugated and under the hopper J, and works in connection with a similar fluted roller, K, also journaled in the cross-pieces of the frame A, and these corrugated rolls are placed longitudinally with and below the slot in the bottom of the angular hopper J. That side of the hopper upon which the reel is placed is sufficiently open to admit the reel-ribs to pass through the hopper in their revolutions.

My improved machine is designed to be propelled like a wheelbarrow, and in order to vary its height according to the size or elevation of the vines to be swept and cleaned, the handles B may be made adjustable vertically.

In use, the machine will be thrust forward upon its driving-wheel C, which will travel between the rows of potato-vines, and by means of the gearing and the belt and pulleys the crushing-rolls F K and the reel G will be revolved, and the beaters $i$ will brush and beat the vines laterally in such a manner as to sweep or knock the insects into the hopper, and thence they will fall through the slot and between the corrugated or grooved rollers, and be crushed between them as they revolve in opposite directions, and in close proximity to each other and to the slot formed in the bottom of the hopper J.

Having experimented with my insect-destroyer, I have found it to work with great success, not only removing the bugs from the vines, but also crushing and destroying them.

It should be stated that by supporting and carrying the machine upon one wheel only, the relation of the reel-ribs to the position and size of the vines can be constantly regulated and governed by the operator, who may tilt the machine laterally at will, according to the nature of the work. This capability, peculiar to my machine, is of great importance, and enables the operator to sweep the bugs which infest the vines into the hopper, whether they happen to be lodged in the upper or lower leaves of the vines.

Having described my invention, I do not desire to be understood as claiming a reel in combination with a machine for removing insects from vines, as such has been known before; but What I do claim, and desire to secure by Letters Patent is—

1. The crushing-rolls F K, in combination with the adjustable reel and hopper J, constructed and arranged as and for the purpose specified.

2. The combination of the frame A, handles B, hopper J, rolls F K, and reel G, with a single driving and carrying wheel, C, substantially as and for the purpose specified.

Witness my hand this 5th day of August, A. D. 1873.

ALFRED A. MIXER.

Witnesses:
    H. P. K. PECK,
    W. O. PECK.